(12) United States Patent
Oehler et al.

(10) Patent No.: US 9,088,333 B2
(45) Date of Patent: Jul. 21, 2015

(54) RECEIVER

(71) Applicant: Fraunhofer-Gesellschaft zur Foerderung der angewandten Forschung e.V., Munich (DE)

(72) Inventors: Frank Oehler, Adelsdorf (DE); Markus Eppel, Eckental (DE); Heinrich Milosiu, Erlangen (DE); Stephan Lensing, Erlangen (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 0 days.

(21) Appl. No.: 14/098,999

(22) Filed: Dec. 6, 2013

(65) Prior Publication Data

US 2014/0093019 A1 Apr. 3, 2014

Related U.S. Application Data

(63) Continuation of application No. PCT/EP2013/054519, filed on Mar. 6, 2013.

(60) Provisional application No. 61/607,330, filed on Mar. 6, 2012.

(51) Int. Cl.
*H03D 1/00* (2006.01)
*H04B 1/16* (2006.01)
*H04B 1/7163* (2011.01)

(52) U.S. Cl.
CPC .............. *H04B 1/16* (2013.01); *H04B 1/71637* (2013.01)

(58) Field of Classification Search
CPC ..... H04B 1/16; H04B 1/71637; H04B 1/7183
USPC .......................... 375/343, 340, 316, 326, 324
See application file for complete search history.

(56) References Cited

U.S. PATENT DOCUMENTS

| 6,487,264 | B1 | 11/2002 | Alley et al. | |
|---|---|---|---|---|
| 7,187,913 | B1 * | 3/2007 | Rahn et al. | 455/188.1 |
| 7,848,384 | B2 | 12/2010 | Pelissier et al. | |
| 2002/0094042 | A1 * | 7/2002 | Chamberlain | 375/343 |
| 2002/0152044 | A1 * | 10/2002 | Shanks et al. | 702/106 |

(Continued)

FOREIGN PATENT DOCUMENTS

| DE | 102010027019 | 7/2010 |
|---|---|---|
| EP | 1830474 | 9/2007 |
| EP | 2053756 | 4/2009 |

*Primary Examiner* — Kenneth Lam
(74) *Attorney, Agent, or Firm* — Michael A. Glenn; Perkins Coie LLP (57) ABSTRACT

A receiver for receiving an RF signal transmitting a bit sequence representing a symbol is provided. The receiver includes an oscillator, a counter, at least one state machine and at least one correlator. The oscillator is configured to oscillate dependent on the received RF signal, wherein the oscillator signal is controlled to provide an oscillation signal based on the oscillation during a plurality of subsequent active periods. The counter is configured to provide a counter value describing threshold crossings of the oscillator signal for each of the active periods. The at least one state machine is connected to the counter and configured to output state values, each state value dependent on two subsequent counter values. The at least one correlator is configured to correlate the output state values with a predefined bit sequence and to output a value representing the symbol dependent on the correlation.

15 Claims, 6 Drawing Sheets

(56) References Cited

U.S. PATENT DOCUMENTS

| | | | |
|---|---|---|---|
| 2006/0039508 A1* | 2/2006 | Wang et al. | 375/329 |
| 2011/0188608 A1* | 8/2011 | Oba | 375/316 |
| 2011/0274141 A1* | 11/2011 | Jantunen et al. | 375/138 |
| 2013/0208831 A1* | 8/2013 | Oehler et al. | 375/316 |

* cited by examiner

RECEIVER

CROSS-REFERENCE TO RELATED APPLICATIONS

This application is a continuation of copending International Application No. PCT/EP2013/054519, filed Mar. 6, 2013, which is incorporated herein by reference in its entirety, and additionally claims priority from U.S. Application No. 61/607,330, filed Mar. 6, 2012, which is also incorporated herein by reference in its entirety.

BACKGROUND OF THE INVENTION

The present invention relates to a receiver for receiving an RF signal transmitting a bit sequence representing a symbol, and to a method for receiving an RF signal transmitting a bit sequence representing a symbol. Some embodiments of the present invention relate to a super regenerative receiver suitable for sub-$\mu$A operation.

Standard regenerative receivers comprise a detector with a positive or regenerative feedback from the output to the input. Thereby, the feedback maintains operation of the oscillator on the verge of oscillation. In a super-regenerative receiver, the detector is switched into and out of oscillation by an oscillator operating at a very low frequency rate, called the quench frequency. The quench frequency is lower than the carrier frequency but higher than the frequency of the modulating signal. That is, the quench oscillator allows oscillation to build up in the regenerative circuit and then causes them to die out.

In the absence of an incoming signal, oscillations are initiated by thermal noise, build up to a critical amplitude and die out. An incoming signal larger than the thermal noise advances the build up time. Thus, the maximum oscillation amplitude is reached sooner. A detector will provide indication of an incoming signal based on the advance of the build up period.

Standard super-regenerative receivers are restricted to oversampling at quench frequencies above the data rate of the received signal, in order to accomplish time integration. However, the local oscillator leads to spurious emissions into the environment of the receiver.

SUMMARY

According to an embodiment, a receiver for receiving an RF signal transmitting a bit sequence representing a symbol may have: an oscillator configured to oscillate dependent on the received RF signal, wherein the oscillator is controlled to provide an oscillation signal based on the oscillation during a plurality of subsequent active periods; a counter configured to provide a counter value describing threshold crossings of the oscillator signal for each of the active periods; at least one state machine connected to the counter and configured to output state values, each state value dependent on two subsequent counter values; and at least one correlator configured to correlate the output state values with a predefined bit sequence and to output a value representing the symbol dependent on the correlation.

According to another embodiment, a method for receiving an RF signal transmitting a bit sequence representing a symbol may have the steps of: providing an oscillation signal based on an oscillation during a plurality of subsequent active periods, wherein the oscillation depends on the received RF signal; obtaining a counter value describing threshold crossings of the oscillator signal for each of the active periods; obtaining state values using at least one state machine, wherein each state value depends on two subsequent counter values; and correlating the output state values with a predefined bit sequence and outputting a value representing the symbol dependent on the correlation.

Another embodiment may have a computer program for performing, when running on a computer, microprocessor or digital circuit, an inventive method.

A receiver for receiving an RF signal transmitting a bit sequence representing a symbol is provided. The receiver comprises an oscillator, a counter, at least one state machine and at least one correlator. The oscillator is configured to oscillate dependent on the received RF signal, wherein the oscillator signal is controlled to provide an oscillation signal based on the oscillation during a plurality of subsequent active periods. The counter is configured to provide a counter value describing threshold crossings of the oscillator signal for each of the active periods. The at least one state machine is connected to the counter and configured to output state values, each state value dependent on two subsequent counter values. The at least one correlator is configured to correlate the output state values with a predefined bit sequence and to output a value representing the symbol dependent on the correlation.

A method for receiving an RF signal transmitting a bit sequence representing a symbol is provided. The method comprises providing an oscillation signal based on an oscillation during a plurality of subsequent active periods, wherein the oscillation depends on the received RF signal. Further, the method comprises obtaining a counter value describing threshold crossings of the oscillator signal for each of the active periods. Further, the method comprises obtaining state values using a state machine, wherein each state value depends on two subsequent counter values. Further, the method comprises correlating the output state values with a predefined bit sequence and outputting a value representing the symbol dependent on the correlation.

BRIEF DESCRIPTION OF THE DRAWINGS

Embodiments of the present invention will be detailed subsequently referring to the appended drawings, in which.

DETAILED DESCRIPTION OF THE INVENTION

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 1:
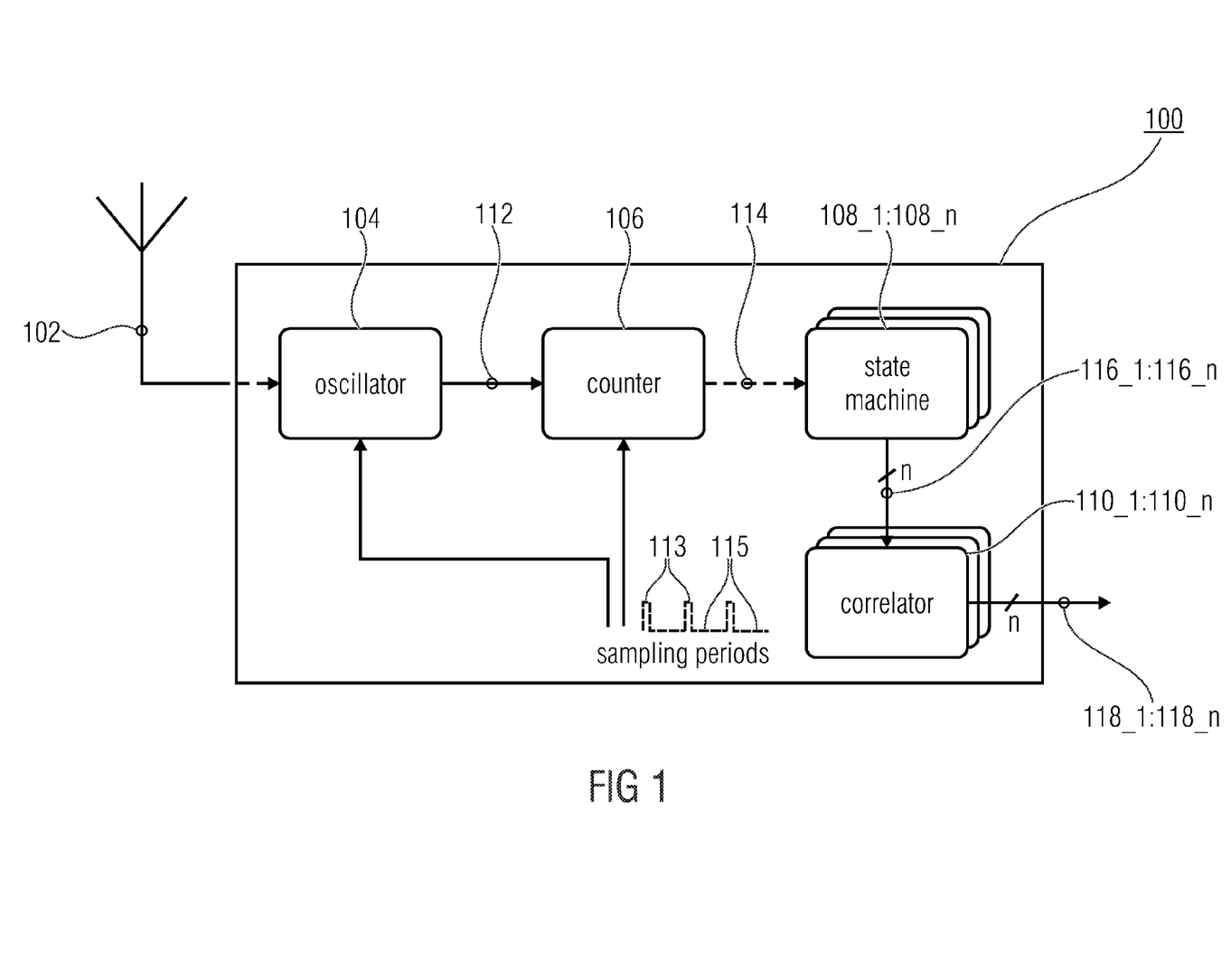
FIG. 1 shows a block diagram of a receiver for receiving an RF signal transmitting a bit sequence representing a symbol, according to an embodiment of the present invention.

FIG. 1 shows a block diagram of a receiver 100 for receiving an RF signal 102 transmitting a bit sequence representing a symbol. The receiver 100 comprises an oscillator 104 (e.g., a super regenerative oscillator), a counter 106, at least one state machine 108_1:108_n and at least one decoder 110_1:110_n (e.g., correlator). The oscillator 104 is configured to oscillate dependent on the received RF signal 102, wherein the oscillator 104 is controlled to provide an oscillation signal 112 based on the oscillation during a plurality of subsequent active periods 113. The counter 106 is configured to provide a counter value 114 describing threshold crossings of the oscillator signal 112 for each of the active periods 113. The at least one state machine 108_1:108_n is connected to the counter 106 and configured to output state values 116_1:116_n, each state value of the state values 116_1:116_n dependent on two subsequent counter values 114. The at least one correlator 110_1:110_n is configured to correlate the output state values 116_1:116_n with a predefined bit sequence and to output a value 118_1:118_n representing the symbol dependent on the correlation.

According to the concept of the present invention, energy consumption and spurious emissions of the receiver 100 can be reduced by operating the oscillator 104 and the counter 106 (only) during the active periods 113. Moreover, a direct digital evaluation of the RF signal 102 can be achieved by means of the at least one state machine 108_1:108_n and the at least one correlator 110_1:110_n.

In some embodiments, the receiver 100 may comprise up to n state machines 108_1:108_n and n correlators 110_1:110_n, wherein n is a natural number greater than or equal to 1 (n≥1). Thereby, the number of state machines 108_1:108_n may be equal to the number of correlators 110_1:110_n.

For example, the receiver 100 can comprise n=2 (or 3, 4, 5, 10, 20, 30, 50, 100 or more) state machines 108_1:108_n and correlators 118_1:118_n. Thereby a first correlator 118_1 can be connected to a first state machine 108_1, wherein a second correlator 1182 can be connected to a second state machine 1082, and wherein an n-th correlator 118_n can be connected to an n-th state machine 108_n.

The first correlator 118_1 can be configured to correlate the output state values 116_1 provided by the first state machine 108_1 with a first bit sequence and to output a first value 118_1 representing the symbol dependent on the correlation. The second correlator 118_2 can be configured to correlate the output state values 116_2 provided by the second state machine 1082 with a second bit sequence and to output a second value 118_2 representing the symbol dependent on the correlation. The n-th correlator 118_n can be configured to correlate the output state values 116_n provided by the n-th state machine 108_n with a n-th bit sequence and to output a n-th value 118_n representing the symbol dependent on the correlation.

Thereby, the correlators 118_1:118_n can be configured to correlate the state values 116_1:116_n with the same or different bit sequences.

Note that instead of correlators 110_1:110_n also decoders 110_1:110_n configured to correlate the output state values 116_1:116_n with the predefined bit sequence (or bit sequences) could be used.

In some embodiments, non-active periods 115 can be interspersed between the active periods 113. In other words, a non-active period 115 can be inserted between two subsequent active periods 113.

The active periods may comprise a duty-cycle ratio of, e.g., 1:100 (or 1:200, 1:500, 1:700, 1:1000, or 1:1500) or less. In other words, the non-active periods 115 can be by a factor of 100 (or 200, 500, 700, 1000 or 1500) greater or larger than the active periods 113.

In some embodiments, the oscillator 104 can be, for example, a voltage controlled oscillator (VCO). Of course, also other implementations of the oscillator 104 are possible.

Figure 2:
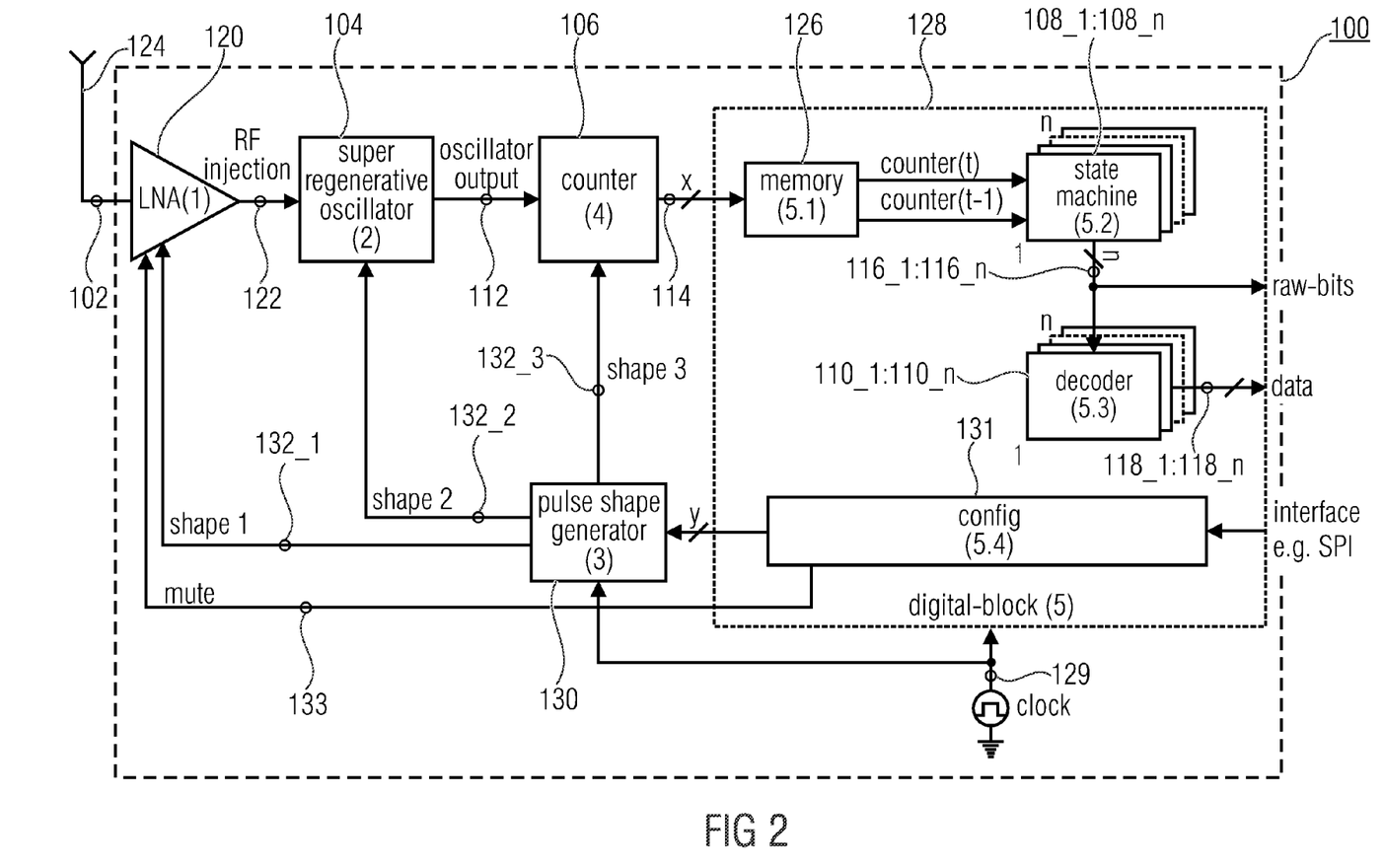
FIG. 2 shows a block diagram of the receiver for receiving an RF signal transmitting a bit sequence representing a symbol, according to a further embodiment of the present invention.

FIG. 2 shows a block diagram of the receiver 100 for receiving the RF signal 102 transmitting a bit sequence representing a symbol, according to a further embodiment of the present invention.

The receiver 100 can comprise a low-noise amplifier 120 connected to the oscillator 104. The low-noise amplifier 120 can be configured to amplify the received RF signal 102 during the active periods 113. Moreover, the low-noise amplifier 120 can be configured to provide an amplified received RF signal 122, wherein the oscillator 104 can be configured to oscillate dependent on the amplified received RF signal 122.

Further, the receiver 100 can comprise an antenna 124 for receiving the RF signal 102 transmitting a bit sequence representing a symbol. The antenna 124 can be connected to the low-noise amplifier 120.

Moreover, the receiver 100 can comprise a memory 126 connected between the counter 106 and the at least one state machine 108_1:108_n, wherein the memory 126 can be configured to provide two subsequent counter values to the at least one state machine 108_1:108_n.

Thereby, the memory 126 can be configured to provide a current counter value (counter(t)) and a previous counter value (counter(t−1)) as the two subsequent counter values to the at least one state machine 108_1:108_n.

As already mentioned, the counter 106 can be configured to provide in each active period a counter value 114 describing the threshold crossings of the oscillator signal 112 for each of the active periods 113. Thereby, the threshold of the counter 106 may be selected to lay above (or below) the noise floor.

The memory 126 can be configured to store (or cache or buffer) the counter values 114 provided by the counter 106 in order to provide the two subsequent counter values to the at least one state machine 108_1:108_n. Therefore, the memory 126 can be an intermediate storage, cache or buffer.

As indicated in FIG. 2, the memory 126, the at least one state machine 108_1:108_n and the at least one correlator 118_1:118_n can form a digital block 128. The digital block 128 can be configured to output the state values 116_1:116_n provided by the at least one state machine 108_1:108_n as raw-bits. Further, the digital block 128 can be configured to output the value (118_1:118_n) provided by the at least one correlator 110_1:110_n as data.

Further, the receiver 100 can comprise a pulse shape generator 130 configured to provide shape signals 132_1:132_3 indicating the active periods 113 (and the non-active periods 115).

For example, the pulse shape generator 130 can be connected to the low-noise amplifier 120 and configured to provide a first shape signal 132_1 (shape 1) for the low-noise amplifier 120. Further, the pulse shape generator 130 can be connected to the oscillator 104 and configured to provide a second shape signal 132_2 (shape 2) for the oscillator 104. Further, the pulse shape generator 130 can be connected to the counter 106 and configured to provide a third shape signal 132_3 (shape 3) for the counter 106.

As shown in FIG. 2, the pulse shape generator 130 and the digital block 128 may receive a clock signal 129. The clock signal 129 can be provided by an external clock or a clock of the receiver 100.

Moreover, the digital block 128 can comprise a configuration unit 131 configured to control the pulse shape generator 130. The configuration unit 131 can be connected to the pulse shape generator 130 in order to configure the shape signals 132_1:132_3 (e.g., the lengths of the active periods 113 and non-active periods 115, or a duty cycle ratio between the active periods 113 and the non-active periods 115).

The configuration unit 131 can further be configured to provide a mute signal 133 for muting the low-noise amplifier 120.

In the following, the functionality of the receiver 100 is explained by means of exemplary courses of signals which may be present in the receiver 100. Thereby, the courses of the signals were selected for illustration purposes and are for no way limiting.

Figure 3:
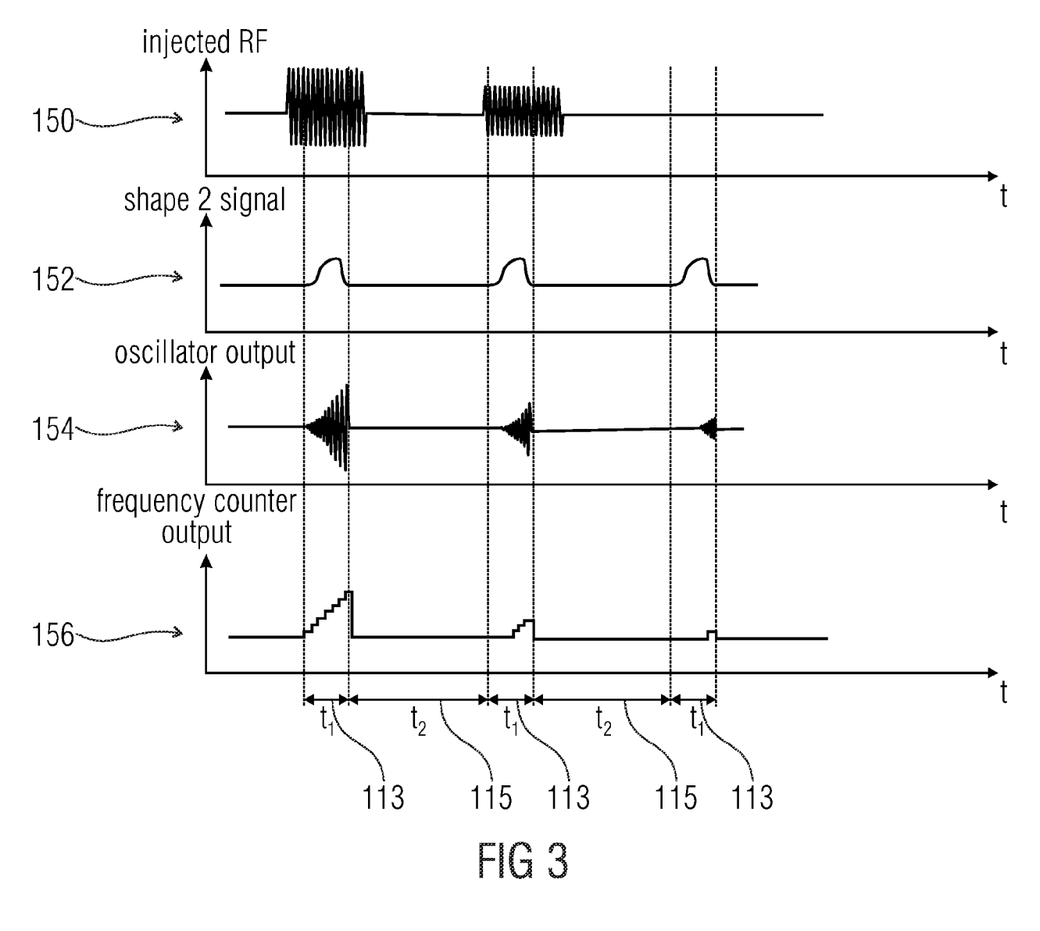
FIG. 3 shows diagrams of signals present in the receiver, according to an embodiment of the present invention.

FIG. 3 shows diagrams of the amplified received RF signal 122, the second shape signal 132_2, the oscillation signal 112 and a counter value signal carrying the counter value 114.

More precisely, a first diagram 150 shows a course of the amplified received RF signal 122 input into the oscillator 104; a second diagram 152 shows a course of the second shape signal 132_2 input into the oscillator 104; a third diagram 154 shows the oscillation signal 112 provided by the oscillator 104; and a fourth diagram 156 shows a course of the counter value signal 114 carrying the counter value. Thereby, the ordinates denote the amplitude or value of the respective signal, where the abscissas denote the time.

Moreover, in FIG. 3 the active periods 113 are denoted with $t_1$ (phase 1), where the non-active periods 115 are denoted with $t_2$ (phase 2).

As shown in FIG. 3, the pulse shape generator 130 may generate different periodic time-continuous waveforms 132_1 to 132_3, each subdivided into two phases, i.e. active periods 113 and non-active periods 115. The shape signals 132_1:132_3 may have the following common properties.

During the active periods 113 (in phase 1, denoted with $t_1$ in FIG. 3) the time-integral of the absolute value of the signal is non-zero. The length of the active periods 113 (phase 1) and its maximum value are configurable by the digital block 128. During the non-active periods 115 (in phase 2, denoted with $t_2$ in FIG. 3) the above integral becomes zero.

The first shape signal 132_1 (shape 1) shown in FIG. 2 can control the gain and hence current consumption of the low-noise amplifier 120. The second shape signal 132_2 (shape 2) can control the oscillator 104 in such a way that it does not oscillate during the non-active periods 115 (in phase 2). During the active periods 113 (in phase 1) of the signal 132_2 (shape 2) the oscillator 104 should start oscillating according to the super-regenerative principle with a time constant T, dependent on the slope and maximal value of the signal 132_2. The signal 132_3 (shape 3) can control the time of operation of the counter 106.

In the following, the functionally of the different features of the receiver 100 are described in detail.

The low-noise amplifier 120 can be configured to amplify during the active periods 113 (in phase 1) of the first pulse shape signal 132_1 and be switched off during the non-active periods 115 (in phase 2). Further, the low-noise amplifier 120 circuit may include a so called muting function controlled by the mute signal 133 of the digital block 128. If the mute signal 133 is high, the low-noise amplifier 120 may switch to a circuit behavior in which it attenuates the RF input signal strongly, but at the same time offers a noise signal to the oscillator 104 as if it were in normal operating mode. It "sees" and amplifies the noise of the antenna impedance but attenuates any antenna signals. For example, the operation can be multiplexed between two identical low-noise amplifiers 120 where one is attached to the antenna 124 and the other to an integrated impedance of the same value as the antenna 124.

The counter 106 can be configured to count the number of periods of the oscillator output signal 112 during the active periods 113 (in phase 1) of the signal 132_2 (shape 2), wherein the result of the counting can be stored in the memory 126 of the digital block 128. During the non-active periods 115 (in phase 2) the counter 106 may reset to zero and switch off.

In other words, the frequency counter 106 can be configured to count the number of the zero crossing events (above the noise floor) during the active periods 113 (in phase 1) of the second shape signal 132_2, wherein the result of the counting can be stored in the memory 126 of the digital block 128. During the non-active periods 115 (in phase 2) the counter 106 may reset to zero and switch off.

Figure 4:
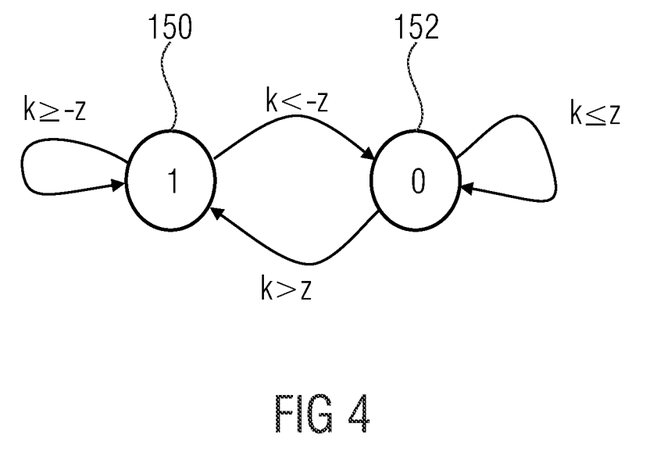
FIG. 4 shows a state diagram of the state machine of the receiver shown in FIGS. 1 and 2, according to an embodiment of the present invention.

FIG. 4 shows a state diagram of a state machine 108_1:108_n, according to an embodiment of the present invention. The state machine 108_1:108_n may comprise a logic high state 150 and a logic low state 152. The logic high state may indicate a logic one, wherein the logic low state 152 may indicate a logic zero.

The state machine 108_1:108_n can be configured to transient from the logic high state 150 to the logic low state 152 if a difference k between the two subsequent counter values falls below a lower threshold −z, i.e. k<−z, and to transient from the logic low state 152 to the logic high state 150 if the difference k between the two subsequent counter values exceeds an upper threshold z, i.e. k>z. Thereby, each state value 118_1:118_n output by the state machine 108_1:108_n may indicate the current state of the state machine 108_1:108_n.

Note that the lower threshold −z may be a negative version of the upper threshold z.

Further, in some embodiments, the receiver 100 may comprise more than one state machine 108_1:108_n. In that case, the state machines 108_1:108_n may comprise different upper thresholds $z_1:z_n$, and different lower thresholds $-z_1:-z_n$.

Moreover, the state machine 108_1:108_n may stay in the logic high state 150, if the difference k between the two subsequent counter values is equal to or greater than the lower threshold −z, i.e. k≥−z. Similarly, the state machine 108_1:108_n may stay in the logic low state 152 if the difference k in between the two subsequent counter values is smaller than or equal to the upper threshold z, i.e. k≤z.

In other words, the state machine 108_1:108_n may compare the current counter output with the previous one and take the difference. Assuming the difference between the current counter value and the previous one was k, then the state machine 108_1:108_n behaves as in FIG. 4 with the configurable threshold parameter z from the digital block 128.

The correlator (or decoder block) 110_1:110_n can be configured to perform a comparison between the state values 116_1:116_n (e.g., received bits from the output of state machine 108_1:108_n) and a configurable bit-sequence (or bit-code) of arbitrary length from the digital block 128. If the output and the configurable code match, the correlator 118_1:118_n may produce a digital signal at its output.

In other words, the correlator $110\_1{:}110\_n$ can be configured to perform a cross correlation between the state values $116\_1{:}116\_n$ (e.g., received bits) and a configurable bit-sequence (or bit-code) of the digital block 128. If the correlation peak exceeds a certain threshold the digital block 128 may trigger a signal $118\_1{:}118\_n$ at the output pin of the digital block.

Note that each of the n correlators $110\_1{:}110\_n$ may be connected to only one of the n state machines $108\_1{:}108\_n$.

For example, a first correlator 110_1 can be connected to a first state machine 108_1, wherein a second correlator 110_2 can be connected to a second state machine 108_2, and wherein an n-th correlator $110\_n$ can be connected to an n-th state machine $108\_n$.

The receiver 100 can be configured to calibrate a length of the active periods 113 such that the oscillator 104 starts oscillating within the active periods 113. For example, the receiver 100 can be configured to calibrate the length of the active periods 113 such that the oscillator 104 starts oscillating within the active period 113 if no RF signal 102 is received by the receiver 100 during the active period 113 or if the bit of the bit sequence transmitted by the RF signal 102 during the active period 113 comprises a logic low state (e.g., logic zero). Further, the receiver 100 can be configured to calibrate the length of the active periods 113 such that the oscillator 104 starts oscillating within the active period 113 only if the bit of the bit sequence transmitted by the RF signal 102 during the active period 113 comprises a logic high state (e.g., logic one).

The receiver 100 can be configured to suppress received RF components in the signal 122 input into the oscillator 104 and to decrease the length of the active periods 113 iteratively until the counter value 114 provided by the counter 106 falls below a predefined calibration threshold, in order to calibrate the length of the active periods 113.

In other words, during calibration, the low-noise amplifier 120 can be brought into mute mode via external configuration or via the configuration unit 131. Thus, no or only strongly attenuated RF signals are injected into the oscillator 104. Its settling-time is increased or even maximized. The settings for the length of the active periods 113 (phase 1) of the pulse shape signals $132\_1{:}132\_3$ are iterated in a decreasing manner and the corresponding counter values 114 are evaluated. If a setting is reached where the counter value 114 is smaller than a given reference value, this setting is stored as a default value for the pulse shape generator 130.

Small counter values 114 mean the oscillator 104 is at the brink of starting oscillation but does not reach full swing within the active periods 113 (phase 1) of the second shape signal 132_2 (shape 2).

Note that calibration may be triggered at any time via a digital input, or (especially) after power up of the receiver 100.

After calibration is completed, any RF signal within the passband of the low-noise amplifier 120 will decrease the settling-time of the oscillator 104 and result in higher output values 114 of the counter 106.

If the power of the received RF signal 102 (RF power) decreases by a certain amount the counter values (counter output) 114 will also decrease. Each state machine $108\_1{:}108\_n$ has its own distinguished threshold $z_1{:}z_n$ and each state machine $108\_1{:}108\_n$ has its own decoder $110\_1{:}110\_n$ attached to it.

Each threshold $z_1{:}z_n$ may correspond to a change around a certain RF input level. The RF power at the input of the low-noise amplifier 102 will translate into discrete counter values 114, modulating the state machines $108\_1{:}108\_n$ according to the RF pattern.

The correlators $110\_1{:}110\_n$ (or decoders) then interpret predefined bit-patterns as symbols. A certain amount of errors in each pattern is tolerated. Each of the n decoders $110\_1{:}110\_n$ may scan for the same bit-patterns, as all other decoders $110\_1{:}110\_n$. It is sufficient if only one of the n decoders $110\_1{:}110\_n$ finds a matching bit-pattern, in order to pass that symbol to the output as received data.

The shape signals $132\_1{:}132\_3$ of the pulse shape generator 130 are duty cycled with active periods 113 ($t_2$) much smaller than non-active periods 115 ($t_1$) (see FIG. 3), e.g. duty-cycle-ratio of 1:1000. This results in a reduction of the emissions of the oscillator signal 112 to the environment of the receiver 100 of around 30 dB and better, if the duty cycle is further decreased.

Because the low-noise amplifier 120 may (be controlled to) operate with a similar duty cycle it can be incorporated in the receiver 100 (or system) with very low average current consumption, attenuating the local oscillator feed through to the antenna 124 in addition the reduction through duty cycling the oscillator 104.

Note that all elements from the digital block 128 from FIG. 2 are not duty cycled and may run persistently.

In the following, the digital evaluation of the bit sequence 168 transmitted by the RF signal 102 is described making reference to a receiver 100 which exemplarily comprises three state machines $108\_1{:}108\_3$ having the thresholds $z_1=35$, $z_2=15$ and $z_3=5$.

Figure 5:
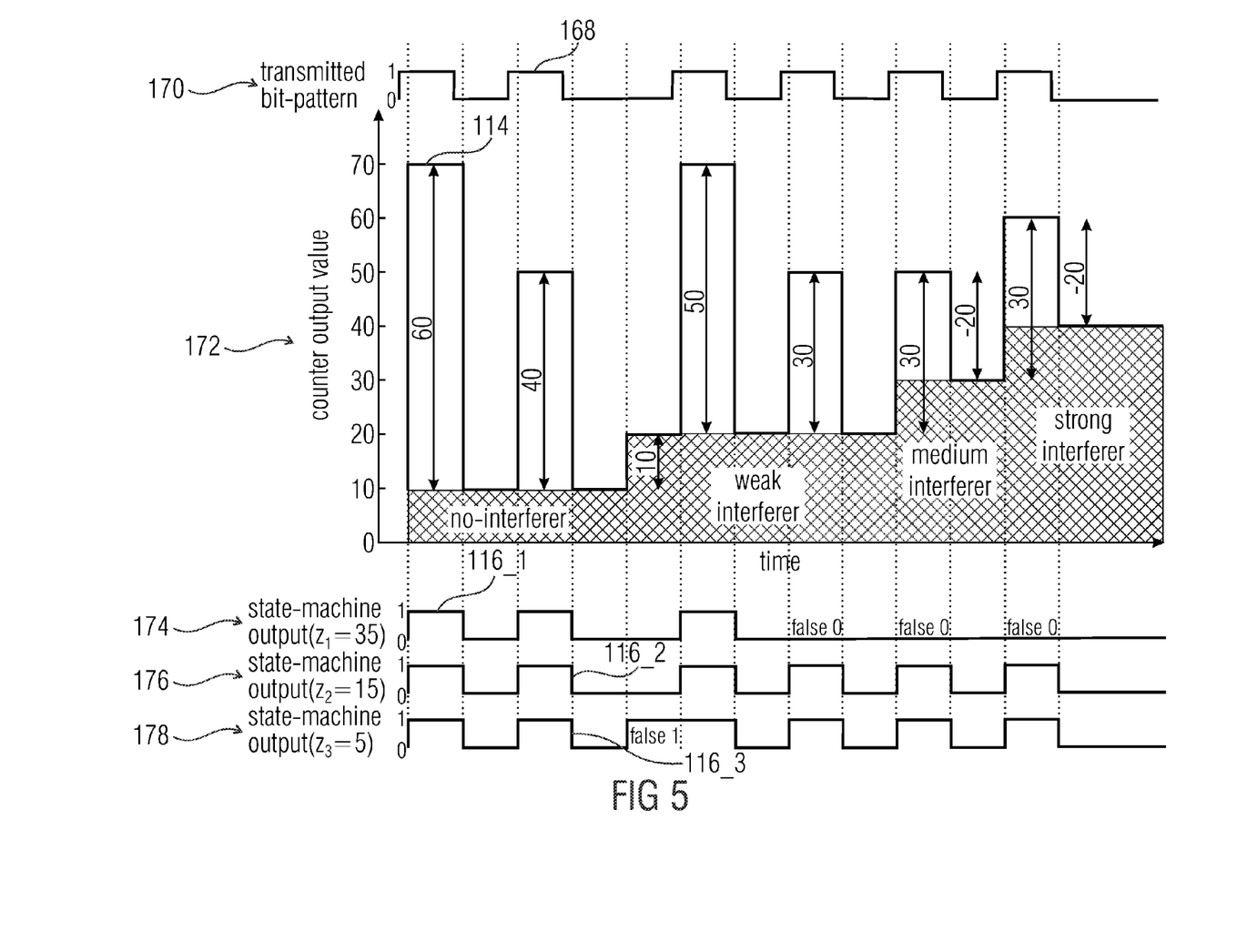
FIG. 5 shows a diagram of an exemplary bit sequence transmitted by the RF signal and diagrams of corresponding counter values and output state values of three state machines.

FIG. 5 shows a diagram of an exemplary bit sequence 168 transmitted by the RF signal 102 together with diagrams of the corresponding counter values 114 provided by the counter 106 and output state values provided by three state machines $108\_1{:}108\_3$.

Thereby, a first diagram 170 shows the bit sequence 168 transmitted by the RF signal 102; a second diagram 172 shows the counter values 114 provided by the counter 106; a third diagram 174 shows the state values 116_1 provided by the first state machine 108_1; a fourth 176 diagram shows the state values 116_2 provided by the second state machine 1082; and a fifth diagram 178 shows the state values 116_3 provided by the third state machine 1083.

The rejection of interferers can be accomplished through the parallel processing in n multiple state machines $108\_1{:}108\_n$ each with distinct thresholds. FIG. 4 shows this behavior in an example for the case n=3, with distinct counter difference thresholds $z_1=35$, $z_2=15$ and $z_3=5$, respectively. It is assumed that the depicted bit pattern 168 is transmitted by the RF signal 102 (modulated onto an RF carrier) and received by the receiver 100. The RF signal 102 is exposed to fading and also gets superimposed with interfering signals of other transmitters within the channel, which lead to an output signal of counter values 114 over time as suggested in the second diagram 172 of FIG. 5. Each state machine $108\_1{:}108\_3$ processes this signal 114 and transforms it into the depicted state values (or bit pattern) $116\_1{:}116\_3$ according to its threshold.

In the case of $z_1=35$ the state-machine-output gives three false zeros because the threshold of 35 is too high for the appearing counter differences of 30. The state machine with $z_2=15$ however gives the correct bit-pattern. $z_3=5$ is too low resulting in the false recognition of a one bit, when the signal strength of the weak interferer increased.

Applying a fault tolerant pattern decoder (e.g. a digital correlator $110\_1:110\_n$), in the case of $z_3=5$ the state machine output will still lead to a positive match at the decoder output.

The result is, that in practice only a small number (e.g. n=5) of both decoders and state machines is sufficient to allow for failure tolerant data reception.

The above example shows that the proposed architecture is capable of proper decoding of bit patterns, in the presence of fading and in-channel interferers, without the use of any feedback (e.g. gain adjusting from the counter value to the analog gain stages).

In other words, the above embodiments provide an improved radio receiver architecture based on the super regenerative receiver.

The improvements incorporate a reduction of spurious emissions, and suitability for current consumption in the range of sub microamperes (e.g., several 100 nA). Further, no adaptive gain-control is needed. In addition, the active period (length of active periods 113) can be optimized through calibration.

Major differences compared to standard super-regenerative receivers are the direct digital evaluation of the RF data, and that no pulse width modulation and no time-integration of pulse width modulation is used.

In some embodiments, the proposed receiver 100 comprises an RF amplifier 120 with mute function, an oscillator 104 with controllable settling-time, a pulse shape generator 130, a counter 106 and a digital block 128. The digital block 128 incorporates a memory-buffer 126, an array of n state-machines $108\_1:108\_n$ and of n decoders $110\_1:110\_n$.

Figure 6:
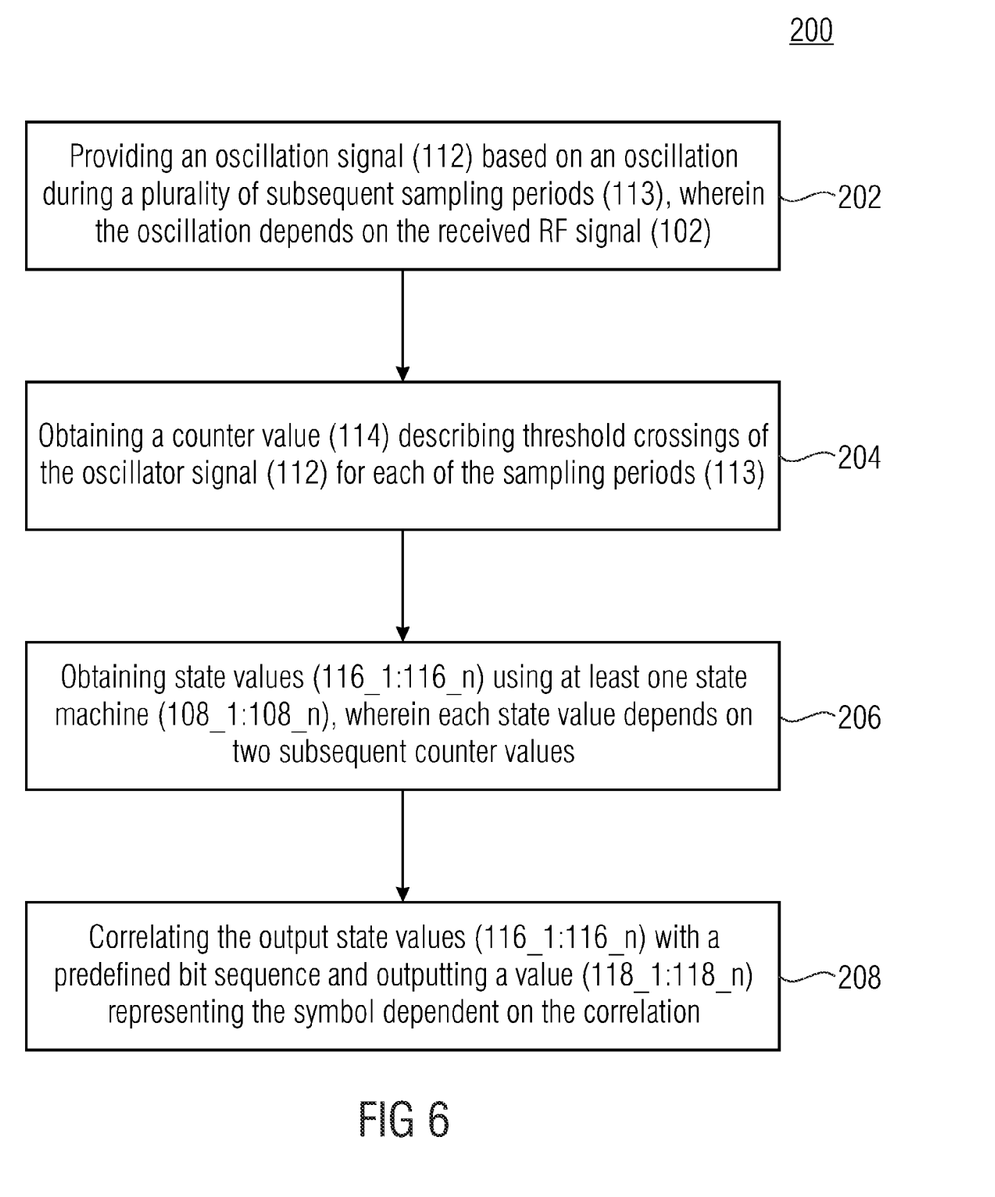
FIG. 6 a flow chart of a method for receiving an RF signal transmitting a bit sequence representing a symbol, according to an embodiment of the present invention.

FIG. 6 shows a flowchart of a method 200 for receiving an RF signal 102 transmitting a bit sequence representing a symbol. The method 200 comprises a step 202 of providing an oscillation signal 112 based on an oscillation during a plurality of subsequent active periods 113, wherein the oscillation depends on the received RF signal 102. Further, the method 200 comprises a step 204 of obtaining a counter value 114 describing threshold crossings of the oscillator signal 112 for each of the active periods 113. Further, the method 200 comprises a step 206 of obtaining state values $116\_1:116\_n$ using at least one state machine $108\_1:108\_n$, wherein each state value depends on two subsequent counter values. Further, the method 200 comprises a step 208 of correlating the output state values $116\_1:116\_n$ with a predefined bit sequence and outputting a value $118\_1:118\_n$ representing the symbol dependent on the correlation.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Receiver for receiving an RF signal transmitting a bit sequence representing a symbol, comprising:
   an oscillator configured to oscillate dependent on the received RF signal, wherein the oscillator is controlled to provide an oscillation signal based on the oscillation during a plurality of subsequent active periods;
   a counter configured to provide a counter value describing threshold crossings of the oscillator signal for each of the active periods;
   at least one state machine connected to the counter and configured to output state values, each state value dependent on two subsequent counter values; and
   at least one correlator configured to correlate the output state values with a predefined bit sequence and to output a value representing the symbol dependent on the correlation.

2. Receiver according to claim 1, wherein non-active periods are interspersed between the active periods.

3. Receiver according to claim 1, wherein the active periods comprise a duty-cycle ratio of at least 1:100 or less.

4. Receiver according to claim 1, wherein the receiver comprises a low-noise amplifier connected to the oscillator and configured to amplify the received RF signal during the active periods.

5. Receiver according to claim 1, wherein the receiver is configured to calibrate a length of the active periods such that the oscillator starts oscillating within the active periods.

6. Receiver according to claim 5, wherein the receiver is configured to:
   suppress received RF components in a signal input to the oscillator; and
   decrease the length of the active periods iteratively until the counter value provided by the counter falls below a predefined calibration threshold;
   in order to calibrate the length of the active periods.

7. Receiver according to claim 1, wherein the receiver comprises a memory connected between the counter and the at least one state machine, wherein the memory is configured to provide the two subsequent counter values to the at least one state machine.

8. Receiver according to claim 7, wherein the memory is configured to provide a current counter value and a previous counter value as the two subsequent counter values to the at least one state machine.

9. Receiver according to claim 1, wherein the at least one state machine comprises a logic high state and a logic low state, wherein the state machine is configured to transient from the logic high state to the logic low state if a difference between the two subsequent counter values falls below a lower threshold, and to transient from the logic low state to the logic high state if the difference between the two subsequent counter values exceeds an upper threshold, wherein each state value output by the at least one state machine indicates the current state of the at least one state machine.

10. Receiver according to claim 9, wherein the lower threshold is a negative version of the upper threshold.

11. Receiver according to claim 9, wherein the receiver comprises at least two state machines comprising different upper thresholds and different lower thresholds.

12. Receiver according to claim 11, wherein the receiver comprises at least two correlators, each correlator connected to one state machine.

13. Receiver according to claim 1, wherein the receiver comprises a pulse shape generator configured to provide shape signals indicating the active periods.

14. Method for receiving an RF signal transmitting a bit sequence representing a symbol, the method comprising:
   providing an oscillation signal based on an oscillation during a plurality of subsequent active periods, wherein the oscillation depends on the received RF signal;
   acquiring a counter value describing threshold crossings of the oscillator signal for each of the active periods;
   acquiring state values using at least one state machine, wherein each state value depends on two subsequent counter values; and
   correlating the output state values with a predefined bit sequence and outputting a value representing the symbol dependent on the correlation.

15. A non-transitory computer-readable medium having stored thereon a computer program for performing, when running on a computer, microprocessor or digital circuit, a method according to claim 14.

* * * * *